United States Patent
Ware et al.

(10) Patent No.: US 7,085,256 B2
(45) Date of Patent: Aug. 1, 2006

(54) SYSTEM AND METHOD FOR ADAPTIVE POLLING IN A WLAN

(75) Inventors: Christopher Ware, Leichhardt (AU); Thierry Rakotoarivelo, Waverley (AU)

(73) Assignee: Motorola, Inc., Schaumburg, IL (US)

( * ) Notice: Subject to any disclaimer, the term of this patent is extended or adjusted under 35 U.S.C. 154(b) by 73 days.

(21) Appl. No.: 10/631,123

(22) Filed: Jul. 31, 2003

(65) Prior Publication Data

US 2005/0025114 A1    Feb. 3, 2005

(51) Int. Cl.
*H04B 7/212* (2006.01)
*H04J 3/00* (2006.01)
*H04Q 11/00* (2006.01)
*H04I 12/403* (2006.01)

(52) U.S. Cl. ...................... 370/347; 370/336
(58) Field of Classification Search ............ None
See application file for complete search history.

(56) References Cited

U.S. PATENT DOCUMENTS

| | | | |
|---|---|---|---|
| 5,430,732 A * | 7/1995 | Lee et al. ............... | 370/319 |
| 6,657,987 B1 * | 12/2003 | Kumar et al. ........... | 370/346 |
| 2002/0093953 A1 | 7/2002 | Naim et al. | |
| 2002/0168940 A1 | 11/2002 | Heijenk et al. | |

FOREIGN PATENT DOCUMENTS

EP    1 130 872 A1    5/2001

* cited by examiner

*Primary Examiner*—Chau Nguyen
*Assistant Examiner*—Cynthia L. Davis
(74) *Attorney, Agent, or Firm*—Daniel K. Nichols; Matthew C. Loppnow

(57) ABSTRACT

A method (S200) and system for scheduling data transmissions between a base station (110) and a plurality of user terminals (130) in a wireless network. The method and system include transmitting a first poll (260) from the base station (110) to a first user terminal traffic stream (Step S210). In response to the first poll (260) the first user terminal traffic stream transmits a first frame (210) to the base station (110), where a queue state of the first user terminal traffic stream is indicated in the header of the first frame (210) (Step S220). The base station (110) removes the first user terminal traffic stream from an active list when the first frame (210) indicates that the queue state is empty (Step S230). The base station (110) then calculates a deferral window (220) and schedules transmissions of other data frames (240) between the base station (110) and the plurality of user terminal traffic streams that remain on the active list (Steps S240 and S250). At the expiration of the deferral window (220) the first user terminal traffic stream is returned to the active list (Step S260).

10 Claims, 3 Drawing Sheets

—PRIOR ART—

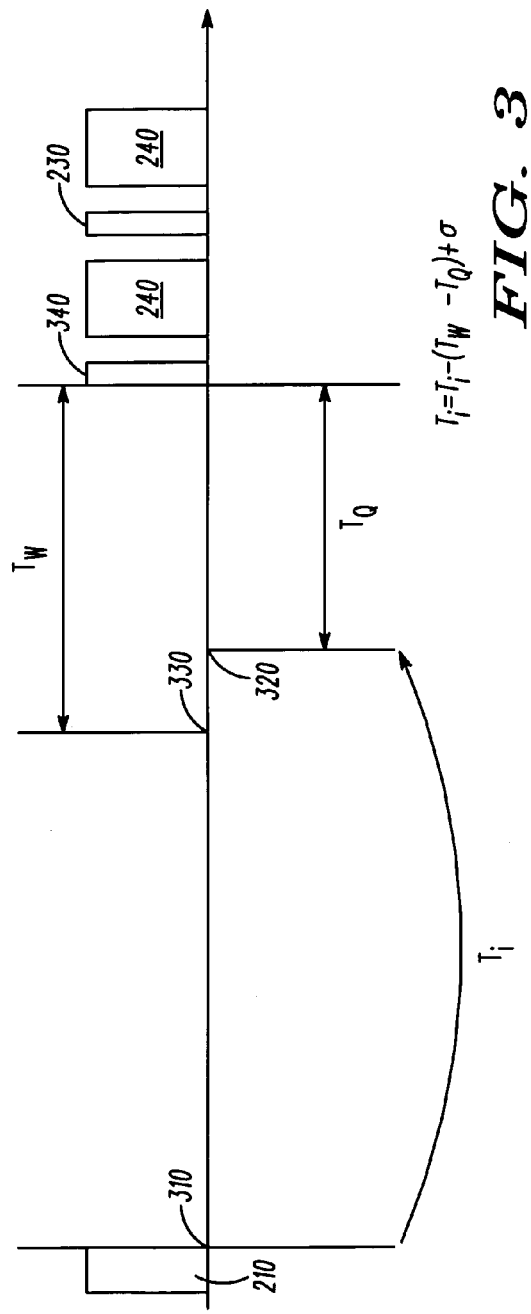
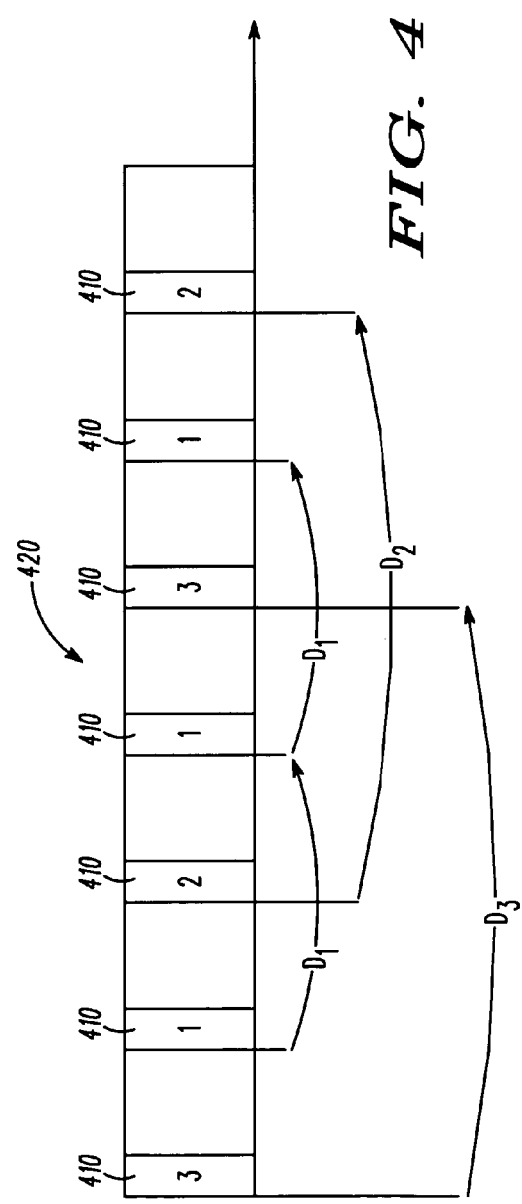

SYSTEM AND METHOD FOR ADAPTIVE POLLING IN A WLAN

BACKGROUND OF THE INVENTION

The present invention relates generally to scheduling data transmissions in a wireless network and more particularly to a system and method for fair and efficient scheduling of data transmissions between a base station and a plurality of user terminal traffic streams.

BACKGROUND OF THE INVENTION

Wireless Local Area Network (WLAN) protocols such as those based on the IEEE 802.11 standards or based on the Bluetooth™ standard are designed to recreate the high Quality of Service (QoS) that is typically supplied in wired networks that use standard LAN protocols such as Ethernet. That high QoS includes uninterrupted network connections, high throughput and reliable delivery of data. Maintaining that QoS in a WLAN is more difficult than in a wired network however because wireless connections exhibit negative characteristics such as "fast fading," "shadow fading" and long-time-scale variations that are not found in wired networks. "Fast fading" concerns rapid fluctuations in signal integrity on the order of milliseconds due to various types of interference; "shadow fading" concerns relatively slower fluctuations on the order of hundreds of milliseconds; and long-time-scale variations concern even slower fluctuations in signal integrity often due to movement of a user terminal such as a Personal Digital Assistant (PDA). Maintaining a high QoS in a WLAN therefore requires vigilant attention to error detection and correction and also requires careful monitoring of the conditions of the wireless link.

Despite the above negative characteristics WLANs are frequently preferred over wired LANs for numerous reasons. For example, with WLANs it is easy to use "ad hoc" networks that can be quickly assembled and torn down; WLANs may also be more economical when compared with the high cost of infrastructure wiring; and users often demand user terminal mobility such as with lap top computers and PDAs.

The IEEE 802.11 standard concerns the operation of a network's Media Access Control (MAC) layer. The MAC layer resides just above a network's Physical (PHY) layer and is responsible for controlling access to the wireless channel. The MAC receives MAC Service Data Units (MSDUs) from the higher layers. MSDU's may be fragmented into smaller MAC Protocol Data Units (MPDUs), which are then transported between network stations across the wireless medium. Network stations are devices connected to the network which may be mobile, portable, or stationary. MPDUs are transmitted between network stations using a carrier sense multiple access with collision avoidance (CSMA/CA) protocol. Collision detection such as that used in the Ethernet protocol cannot be used in wireless transmissions, because when a wireless station is transmitting it cannot hear other stations on the network as its own signal will interfere with any received signal. The IEEE 802.11 standard refers to the above method of channel access as the Distributed Co-Ordination Function (DCF).

A second channel access method is provided in networks where an Access Point (AP) is present. This method, referred to as the Point Co-ordination Function (PCF), uses polling to provide access to the wireless medium. The AP constructs a polling list that determines the order in which the stations within the network will be polled.

In an IEEE 802.11 network, stations are collected into a Basic Service Set (BSS). A BSS may comprise an ad hoc network where all stations in the network can communicate directly with all other stations. Alternatively a BSS may include an AP in which case it is called an infrastructure BSS. In an infrastructure BSS, all stations communicate exclusively through the AP. The AP is often connected to a wired LAN and therefore can significantly increase the range and resources available to a BSS.

Extensions to the existing IEEE 802.11 protocol will include the IEEE 802.11 (e) QoS extensions. These are based on both the CSMA/CA channel access method, and on the polling method. In an infrastructure BSS that is providing QoS, the AP must schedule all data downlinks to all stations in the BSS and all data uplinks from the stations to the AP. Optimizing such scheduling using a scheduling algorithm is often a complex process that requires consideration of numerous variables such as the specific QoS requirements of individual stations, fading disruptions, and the load of individual stations (i.e., the amount of data queued at a station waiting to be uplinked to the AP).

In a Bluetooth™ network, similar scheduling requirements exist. A Bluetooth™ piconet requires a MAC layer scheduling algorithm to schedule all uplinks and downlinks between a master node and all slave nodes in the piconet. For purposes of describing the present invention, APs or Masters are herein generically referred to as base stations; and nodes or stations are generically referred to as user terminals.

A base station may communicate with user terminals using explicit and implicit polls. User terminals are generally allowed to transmit data to the base station only if the base station polled the user terminal in an immediately preceding time slot. An explicit poll is when a base station has no data to download to a user terminal, but needs to inform the user terminal that it is free to uplink data to the base station. The base station therefore transmits a null frame (a frame that includes no data) to the user terminal, which tells the user terminal that it is free to uplink data. An implicit poll is when the base station downloads data to a user terminal and thereby implicitly informs the user terminal that it is free to uplink data immediately following the download.

Various methods of polling exist such as Round Robin polling where user terminals are polled cyclically one after another regardless of whether a user terminal has data to transmit or not. Round Robin polling is thus considered inefficient because bandwidth is wasted on idle user terminals even if other fully loaded user terminals require additional bandwidth.

Fair Exhaustive Polling is more efficient than Round Robin polling as it divides user terminals into two categories: active user terminals and inactive user terminals. The active user terminals are polled using a Round Robin technique; and the inactive user terminals are polled only intermittently to determine whether they should become active user terminals. Fair Exhaustive Polling more efficiently utilizes the limited bandwidth available to the network and is considered more fair because fully loaded user terminals are provided more time to transmit.

Numerous other algorithms exist that attempt to achieve fair and efficient polling. In algorithms designed to provide a probabilistic delay bound (i.e., a QoS requirement that places limits on how long data frame transmissions can be delayed) on an uplink channel, the base station requires information about the needed individual data stream bandwidth. However, by attempting to minimize channel access delay, most algorithms will result in an inefficient polling list. That is because there is a high probability of either multiple polls being sent per channel access opportunity effectively used, or polls arriving significantly earlier than the corresponding data frames.

There is therefore a need for an improved algorithm for estimating the individual stream bandwidth requirements of an uplink channel and for fairly and efficiently scheduling access to a wireless network's limited bandwidth. Further, there is a need to overcome the lack of accurate user terminal queue state information at a base station. QoS scheduling algorithms designed to employ queuing delay as the traffic metric are required to actively sample the individual queue delays. For an uplink stream, this must be reported back to the base station. Given that a realistic scheduling algorithm implementation must generate a polling list over a future scheduling window based on collected information, there is significant potential for inaccurate or delayed information resulting in poor network performance.

SUMMARY OF THE INVENTION

The present invention provides a method and system for scheduling data transmissions between a base station and a plurality of user terminals in a QoS wireless network. The method and system include transmitting a first poll from the base station to a first user terminal traffic stream. In response to the first poll the first user terminal traffic stream transmits a first frame to the base station, where a queue state of the first user terminal traffic stream is indicated in the header of the first frame. The base station removes the first user terminal traffic stream from an active list when the first frame indicates that the queue state is empty. The base station then calculates a deferral window and schedules transmissions of data frames between the base station and the plurality of user terminal traffic streams that remain on the active list. At the expiration of the deferral window the first user terminal traffic stream is returned to the active list.

BRIEF DESCRIPTION OF THE DRAWINGS

Other aspects of the present invention will become apparent from the following detailed description taken together with the drawings in which:

FIG. 3 is a timing diagram that illustrates the operation of an algorithm for adapting a deferral window according to an embodiment of the present invention; and FIG. 4 is a timing diagram that illustrates a polling list generated by a scheduling algorithm according to an embodiment of the present invention.

DETAILED DESCRIPTION OF THE PREFERRED EMBODIMENTS

Figure 1:
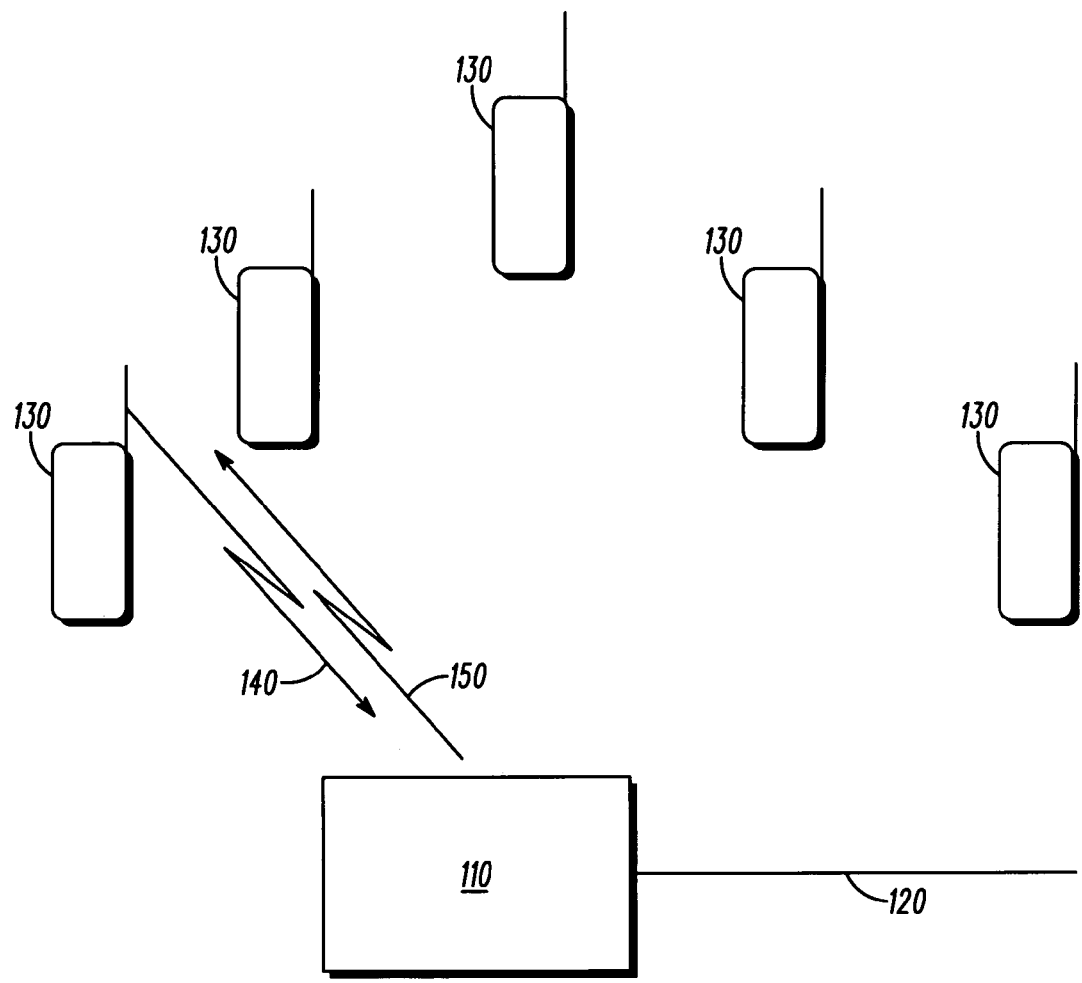
FIG. 1 is a simplified schematic drawing of a prior art WLAN.

Referring to the drawings, wherein like reference characters designate like or corresponding elements throughout the various views, FIG. 1 is a simplified schematic drawing of a prior art WLAN showing a base station 110 connected to a wired LAN 120. The base station 110 communicates wirelessly with several user terminals 130 through uplink channels 140 and downlink channels 150. Each user terminal 130 may concurrently support multiple user terminal traffic streams.

Figure 2A:
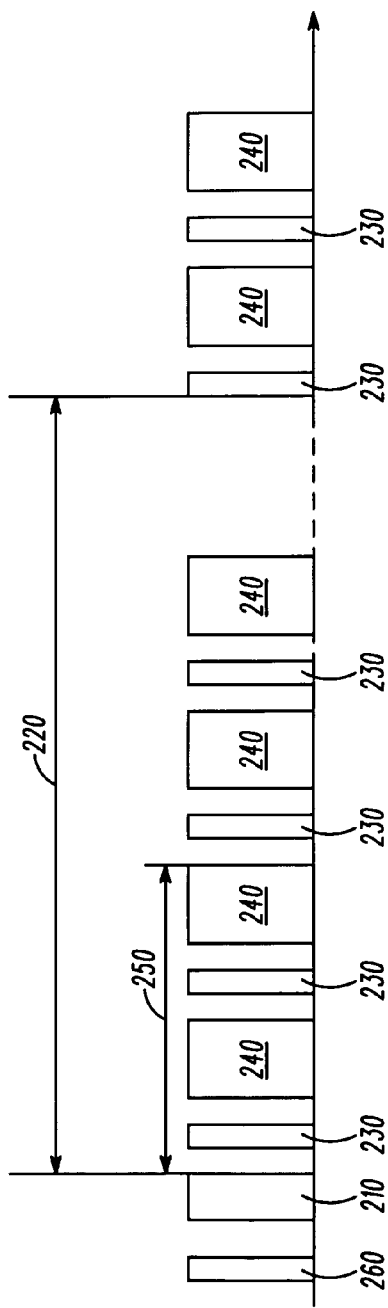
FIG. 2A is a timing diagram illustrating a scheduling method according to an embodiment of the present invention.

FIG. 2A is a timing diagram illustrating a scheduling method according to the present invention for determining when a base station 110 should actively remove user terminal traffic streams from, and then restore the traffic streams to, an active list based on a known queue state. The active list is a list of all user terminal traffic streams that are estimated to have data waiting either to be uploaded from a user terminal 130 to the base station 110, or downloaded from the base station 110 to a user terminal 130.

Figure 2B:
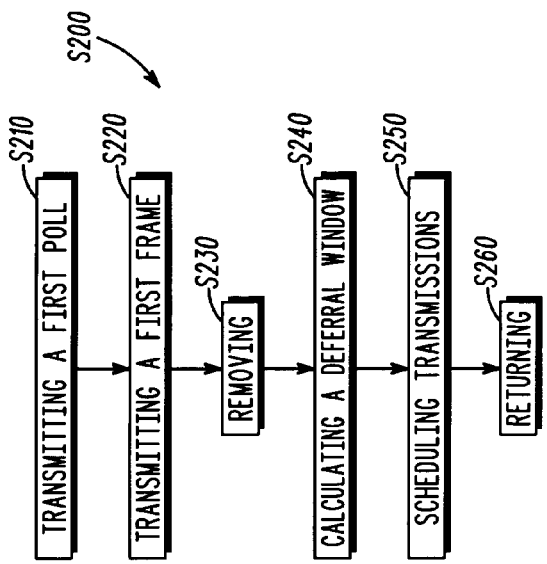
FIG. 2B is a generalized flow diagram illustrating the same scheduling method as represented in the timing diagram of FIG. 2A.

FIG. 2B is a generalized flow diagram illustrating the same scheduling method S200 as represented in the timing diagram of FIG. 2A. As represented in both FIGS. 2A and 2B, the present invention involves the steps of transmitting, at a transmitting step S210, a first poll 260 from a base station 110 to a first user terminal traffic stream that is on the above described active list. A first frame 210 is then transmitted from the first user terminal traffic stream to the base station 110 in response to the first poll 260 at a transmitting a first frame step S220. A queue state of the first user terminal traffic stream is indicated in a header of the first frame 210 that is transmitted to the base station 110.

At a removing step S230, the first user terminal traffic stream is removed from the active list when the first frame 210 that is transmitted to the base station 110 indicates that the queue state of the first user terminal traffic stream is empty. If a user terminal is removed from the active list, a period of time called a deferral window 220 is calculated at a calculating a deferral window step S240. Meanwhile transmissions of other user terminal traffic streams that remain on the active list are scheduled and other polls 230 and other data frames 240 are transmitted at a scheduling transmissions of data frames step S250. The first user terminal traffic stream is then returned to the active list when the deferral window 220 expires at returning step S260.

A user terminal traffic stream indicates that it has no data waiting to be transmitted (i.e., its queue state is empty) to the base station 110 by sending either 1) a first frame 210 that is a null frame to the base station 110, or 2) a first frame 210 that is a data frame to the base station 110, where the data frame indicates that the queue state of the user terminal traffic stream is empty. A user terminal traffic stream indicates its queue state within the header of the data frame 210 or null frame 210 that is sent to the base station 110. On initialization, the base station 110 generates a poll for an uplink traffic stream, the response to which indicates the instantaneous queue state of a particular user terminal traffic stream. Once it is known that other data frames 240 are waiting to be transmitted to the base station 110, the other data frames 240 can be scheduled by the base station 110 and served accordingly. Only when a received QoS header indicates that no packets remain in a user terminal traffic stream's buffer is the user terminal traffic stream removed from the active list.

An algorithm for calculating the deferral window 220 according to one embodiment of the present invention is given in Equation (1):

$$T_D = \begin{cases} T_i, & L_i/\rho_i \geq T_{db} \\ T_s, & \text{otherwise} \end{cases} \quad (1)$$

where $T_i$ is an interval selected by a deferral window adaptation algorithm as discussed below, $T_{db}$ is a requested probabilistic delay bound, $L_i$ is a nominal data frame size, $\rho_i$ is a mean data transfer rate, $T_s$ is a scheduling window 250, and $T_D$ is the duration of the deferral window 220. The above algorithm employs the minimum set of traffic parameters required by the IEEE 802.11 draft QoS specification, and tests whether a user terminal traffic stream is likely to generate a new data frame 240 within a probabilistic delay bound. If the user terminal traffic stream is likely to generate a large number of data frames 240 per probabilistic delay bound, the deferral window 220 is set equal to the scheduling window 250. That ensures that no additional polls 230 are generated until the next scheduling round. Alternatively, if a small number of data frames 240 are likely to be generated, an adaptive deferral period is selected in order to minimize wasted polling overhead.

When the deferral window 220 expires, the user terminal traffic stream is returned to the active list based on the assumption that data is now ready to be transmitted from the user terminal traffic stream and a subsequent poll 230 will solicit an uplink data frame 240. Information in the header of the uplink data frame 240 then allows the base station 110 to determine the remote queue state of the user terminal traffic stream. In this manner, according to the presently described embodiment, a user terminal traffic stream will be polled at least once per probabilistic delay bound, or scheduling window 250, depending on the data load offered by the user terminal traffic stream.

The method and system of the present invention ensures that a relatively inactive user terminal traffic stream, requiring fewer polls 230 per probabilistic delay bound period, will receive a minimum of one poll 230 over each probabilistic delay bound period. The user terminal traffic stream also retains the opportunity to solicit greater capacity when required. A higher rate user terminal traffic stream is able to solicit an appropriate number of polls 230, given that there will generally be data frames 240 waiting in the buffer of the user terminal traffic stream. The method and system of the present invention therefore removes excessive polling overhead, improving channel capacity at the expense of some additional upfront channel access delay for uplink channel transmissions. The scheduling algorithm defined above results in a consistent deferral window 220 that is commensurate with the requested probabilistic delay bound for a user terminal traffic stream across a range of offered data loads.

The duration of the deferral window 220 may also be adaptively controlled to match the offset between the time at which a user terminal traffic stream is returned to the active list, and the time at which the next data frame 240 arrives at the queue of the user terminal traffic stream. The user terminal traffic stream indicates the average time delay required for the first in line data frame 240 to reach the base station 110, which indication can be achieved through the data frame header.

As illustrated in FIG. 3, an algorithm for adapting the deferral window 220 according to one embodiment of the present invention is given in Equation (2):

$$T_i = T_i - (T_W - T_Q) + \sigma \qquad (2)$$

where $T_i$ is now set as the deferral window 220 that is the time from the removal point 310, when the user terminal traffic stream is removed from the active list, until the return point 320 when the user terminal traffic stream is returned to the active list. ($T_i$ can be initialized to the requested probabilistic delay bound.) $T_W$ is the average time between the first in line data frame arrival point 330 in the user terminal queue and the arrival of the first poll 340 since the return of the user terminal traffic stream to the active list. $T_Q$ is the average time between the return point 320 of the user terminal traffic stream to the active list and the scheduled transmission of the next poll 340. $\sigma$ is a heuristic factor based on the inter-arrival period variance of the uplink traffic stream.

Referring again to FIG. 3, in the case where $T_i$ is too long and the new data frame 240 that arrives at point 330 is forced to wait for the next uplink poll 340, $T_W$ will be positive and hence $T_i$ will be reduced. Conversely, when $T_i$ is too short and the poll 340 arrives prior to the first in line data frame arrival point 330, $T_W$ will be negative and hence $T_i$ is increased.

Alternatively, other embodiments of the present invention may calculate the deferral window 220 in a manner that does not make use of either the above Equation (1) or Equation (2). In cases where the user terminal traffic streams have a defined, consistent inter-arrival period, the deferral window 220 may be calculated based on the inter-arrival period.

A consistent inter-arrival period is a common characteristic of voice and video data streams and corresponds to the period between voice or video data frames 240 generated by a codec. The voice or video application passes data frames 240 down to the MAC layer as one or more MSDU's. These are then fragmented into MPDU's as appropriate. The consistent inter-arrival period results in a characteristic where a user terminal traffic stream data queue is filled regularly with a variable number of data frames 240. The user terminal traffic stream signals the inter-arrival period at the MAC layer. The base station 110 is then able to leave each user terminal traffic stream on the active list until either a first data frame 210 or a first null frame 210 indicates that the traffic stream queue state is empty. The base station 110 then removes the user terminal traffic stream from the active list until the next expected inter-arrival period.

The method and system of the present invention may also include, optionally, calculating individual traffic stream delays based on the elapsed time since a user terminal traffic stream's most recent channel access opportunity. That helps the scheduling algorithm to treat fairly both uplink channels 140 and downlink channels 150. Otherwise, if the scheduling algorithm uses actual queuing delays to determine which user terminal traffic stream should next have access to the available network bandwidth, the schedule will be unfairly biased in favor of the downlink channels 150. Because the traffic stream queues are maintained locally at the user terminal 130, the base station 110 has real time queuing delay information for all downlink channels 150. However, as the uplink data frames 240 are queued at each user terminal traffic stream, the base station 110 must wait until the individual uplink queueing delays are signaled by the user terminal traffic streams.

Therefore it is fairer to use the time at which the most recent uplink or downlink data frame 240 was transmitted when scheduling channel access opportunities. The scheduling algorithm is controlled by the base station 110 that has access to the time at which the most recent data frame 240 was transmitted for all uplink channels 140 and downlink channels 150. Thus the scheduling algorithm uses the elapsed time since the most recent data frame transmission because the temporal state of this variable is consistent across all uplink channels 140 and downlink channels 150. FIG. 4 is a timing diagram that illustrates a polling list 420 generated by a scheduling algorithm according to an embodiment of the present invention. As shown, the last transmission opportunity delay (indicated in FIG. 4 by $D_x$ for each traffic stream component 410) for all traffic streams is examined when determining the next traffic stream for service in the polling list 420.

The present invention is therefore a novel method and system for estimating the individual stream bandwidth requirements of an uplink channel 140 and for fairly and efficiently scheduling access to a wireless network's limited bandwidth. The invention thus removes excessive polling overhead, improving channel capacity at the expense of some additional upfront channel access delay for uplink channels 140. Embodiments of the present invention also create a consistent deferral window 220 that is commensurate with the requested probabilistic delay bound for a user terminal traffic stream across a range of offered data loads. Further, by examining the time at which the most recent uplink or downlink data frame 240 was transmitted when scheduling channel access opportunities, embodiments of the present invention are able to treat fairly both uplink channels 140 and downlink channels 150.

It should be understood that the above description is intended to be illustrative and not restrictive. Although the present invention has been fully described concerning the preferred embodiments thereof and with reference to the accompanying drawings, it should be noted that numerous changes and modifications would be readily apparent to those skilled in the art. Such changes and modifications should be understood as included within the scope of the present invention as defined by the appended claims.

What is claimed is:

1. A method of scheduling data transmissions between a base station and a plurality of user terminal traffic streams in a wireless QoS network, comprising:
   transmitting a first poll from said base station to a first user terminal traffic stream in an active list of the user terminal traffic streams;
   transmitting at least one frame from a group of data frames from said first user terminal traffic stream to said base station in response to said first poll, wherein a queue state of said first user terminal traffic stream is indicated in said frame;
   removing said first user terminal traffic stream from said active list when said frame indicates that said queue state is empty;
   calculating a deferral window for said first user terminal traffic stream;
   scheduling transmissions of data frames between said base station and said plurality of user terminal traffic streams that remain on said active list; and
   returning said first user terminal traffic stream to said active list at the expiration of said deferral windows,
   wherein said deferral window is calculated using an algorithm based on the following equation:

$$T_D = \begin{cases} T_i, & L_i/\rho_i \geq T_{db} \\ T_s, & \text{otherwise} \end{cases} \quad (1)$$

where $T_i$ is an interval selected by a deferral window adaptation algorithm, $T_{db}$ is a requested delay bound, $L_i$ is a nominal data frame size, $\rho_i$ is a mean data transfer rate, $T_s$ is a scheduling window, and $T_D$ is the duration of said deferral window.

2. The method of claim 1, wherein $T_i$ is calculated using an algorithm based on the following equation:

$$T_i = T_i - (T_W - T_Q) + \sigma$$

where $T_W$ is the average time between a first in line data frame arrival point in a user terminal traffic stream queue and the arrival of a first poll since a previous return of said user terminal traffic stream to said active list, $T_Q$ is the average time between the return of said user terminal traffic stream to said active list and the scheduled transmission of a next poll, and $\sigma$ is a heuristic factor based on the inter-arrival period variance of an uplink traffic stream.

3. The method of claim 1, wherein said deferral window is calculated based on a defined inter-arrival period of a user terminal traffic stream.

4. The method of claim 3, wherein said inter-arrival period corresponds to a period between voice or video data frames generated by a codec.

5. A system of scheduling data transmissions comprising:
   a plurality of user terminal traffic streams in an active list; and
   a base station, wherein said base station is operable to:
      transmit a first poll to a first user terminal traffic stream selected from said plurality of user terminal traffic streams;
      receive at least one frame from a group of data frames from said first user terminal traffic stream in response to said first poll, wherein a queue state of said first user terminal traffic stream is indicated in said frame;
      remove said first user terminal traffic stream from the active list when said frame indicates that said queue state is empty;
      calculate a deferral window for said first user terminal traffic stream;
      schedule transmissions of data frames between said base station and said plurality of user terminal traffic streams that remain on said active list; and
      return said first user terminal traffic stream to said active list at the expiration of said deferral window,
      wherein said deferral window is calculated using an algorithm based on the following equation:

$$T_D = \begin{cases} T_i, & L_i/\rho_i \geq T_{db} \\ T_s, & \text{otherwise} \end{cases} \quad (1)$$

where $T_i$ is an interval selected by a deferral window adaptation algorithm, $T_{db}$ is a requested delay bound, $L_i$ is a nominal data frame size, $\rho_i$ is a mean data transfer rate, $T_s$ is a scheduling window, and $T_D$ is the duration of said deferral window.

6. The system of claim 5, wherein $T_i$ is calculated using an algorithm based on the following equation:

$$T_i = T_i - (T_W - T_Q) + \sigma$$

where $T_W$ is the average time between a first in line data frame arrival point in a user terminal traffic stream queue and the arrival of a first poll since a previous return of said user terminal traffic stream to said active list, $T_Q$ is the average time between the return of said user terminal traffic stream to said active list and the scheduled transmission of a next poll, and σ is a heuristic factor based on the inter-arrival period variance of an uplink traffic stream.

7. The system of claim 5, wherein said deferral window is calculated based on a defined inter-arrival period of a user terminal traffic stream.

8. The system of claim 7, wherein said inter-arrival period corresponds to a period between voice or video data frames generated by a codec.

9. A system of scheduling data transmissions comprising:
a plurality of user terminal traffic streams in an active list;
a base station;
means for transmitting a first poll from said base station to a first user terminal traffic stream selected among said plurality of user terminal traffic streams;
means for transmitting at least one frame from a group of data frames from said first user terminal traffic stream to said base station in response to said first poll;
means for removing said first user terminal traffic stream from the active list when said frame indicates that said queue state is empty;
means for calculating a deferral window for said first user terminal traffic stream using an algorithm based on the following equation:

$$T_D = \begin{cases} T_i, & L_i/\rho_i \geq T_{db} \\ T_s, & \text{otherwise} \end{cases} \quad (1)$$

where $T_i$ is an interval selected by a deferral window adaptation algorithm, $T_{db}$ is a requested delay bound, $L_i$ is a nominal data frame size, $\rho_i$ is a mean data transfer rate, $T_s$ is a scheduling window, and $T_D$ is the duration of said deferral window;
means for scheduling transmissions of data frames between said base station and said plurality of user terminal traffic streams that remain on said active list; and
means for returning said first user terminal traffic stream to said active list at the expiration of said deferral window.

10. The system of claim 9, wherein $T_i$ is calculated using an algorithm based on the following equation:

$$T_i = T_i - (T_W - T_Q) + \sigma$$

where $T_W$ is the average time between a first in line data frame arrival point in a user terminal traffic stream queue and the arrival of a first poll since a previous return of said user terminal traffic stream to said active list, $T_Q$ is the average time between the return of said user terminal traffic stream to said active list and the scheduled transmission of a next poll, and σ is a heuristic factor based on the inter-arrival period variance of an uplink traffic stream.

* * * * *